(12) United States Patent
Becker

(10) Patent No.: US 11,293,513 B2
(45) Date of Patent: *Apr. 5, 2022

(54) METHOD AND APPARATUS FOR AN ADJUSTABLE DAMPER

(71) Applicant: Fox Factory, Inc., Braselton, GA (US)

(72) Inventor: William M. Becker, Aptos, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/995,640

(22) Filed: Aug. 17, 2020

(65) Prior Publication Data
US 2020/0378464 A1 Dec. 3, 2020

Related U.S. Application Data

(63) Continuation of application No. 16/259,734, filed on Jan. 28, 2019, now Pat. No. 10,746,250, which is a continuation of application No. 15/679,471, filed on Aug. 17, 2017, now Pat. No. 10,228,039, which is a continuation of application No. 14/822,859, filed on Aug. 10, 2015, now Pat. No. 9,739,331, which is a continuation of application No. 13/890,753, filed on May 9, 2013, now Pat. No. 9,103,400.

(60) Provisional application No. 61/644,859, filed on May 9, 2012.

(51) Int. Cl.
| | |
|---|---|
| *F16F 9/43* | (2006.01) |
| *B62K 25/08* | (2006.01) |
| *F16F 9/34* | (2006.01) |
| *B62K 25/04* | (2006.01) |

(52) U.S. Cl.
CPC .............. *F16F 9/435* (2013.01); *B62K 25/08* (2013.01); *B62K 2025/048* (2013.01); *F16F 9/34* (2013.01)

(58) Field of Classification Search
CPC . F16F 9/34; F16F 9/346; F16F 9/3465; B62K 2025/048
See application file for complete search history.

(56) References Cited

U.S. PATENT DOCUMENTS

| | | |
|---|---|---|
| 5,190,126 A | 3/1993 | Curnutt |
| 5,503,258 A | 4/1996 | Clarke et al. |
| 5,697,477 A | 12/1997 | Hiramoto et al. |
| 5,816,281 A | 10/1998 | Mixon |
| 5,853,071 A | 12/1998 | Robinson |
| 6,135,434 A | 10/2000 | Marking |
| 6,296,092 B1 | 10/2001 | Marking et al. |
| 6,311,961 B1 | 11/2001 | Julia |
| 6,360,857 B1 | 3/2002 | Fox et al. |
| 6,415,895 B2 | 7/2002 | Marking et al. |
| 6,581,948 B2 | 6/2003 | Fox |
| 6,592,136 B2 | 7/2003 | Becker et al. |
| 6,604,751 B2 | 8/2003 | Fox |
| 6,978,872 B2 | 12/2005 | Turner |
| 7,128,192 B2 | 10/2006 | Fox |
| 7,255,210 B2 | 8/2007 | Larsson et al. |
| 7,261,194 B2 | 8/2007 | Fox |
| 7,273,137 B2 | 9/2007 | Fox |

(Continued)

*Primary Examiner* — Vishal R Sahni

(57) ABSTRACT

An air bleed system for a suspension fork or shock absorber includes: a fluid passage between an interior of the suspension and an exterior of the suspension; and a manually operable valve having a first position substantially closing the fluid passage and a second position allowing fluid flow between the interior and the exterior.

1 Claim, 4 Drawing Sheets

(56) References Cited

U.S. PATENT DOCUMENTS

| | | |
|---|---|---|
| 7,308,976 B2 | 12/2007 | Turner |
| 7,374,028 B2 | 5/2008 | Fox |
| 7,699,146 B1 | 4/2010 | Becker et al. |
| 8,368,193 B2 | 2/2013 | Lin et al. |
| 8,480,064 B2 | 7/2013 | Talavasek |
| 9,103,400 B2 | 8/2015 | Becker |
| 9,739,331 B2 | 8/2017 | William |
| 10,228,039 B2 | 3/2019 | Becker |
| 10,746,250 B2 * | 8/2020 | Becker .................. B62K 25/08 |
| 2003/0001358 A1 | 1/2003 | Becker et al. |
| 2006/0065496 A1 | 3/2006 | Fox |
| 2006/0289258 A1 | 12/2006 | Fox |
| 2007/0012531 A1 | 1/2007 | Fox et al. |
| 2007/0068751 A1 | 3/2007 | Fox et al. |
| 2007/0119670 A1 | 5/2007 | Fox |
| 2007/0158927 A1 | 7/2007 | Fox |
| 2007/0227844 A1 | 10/2007 | Fox |
| 2007/0227845 A1 | 10/2007 | Fox |
| 2007/0228690 A1 | 10/2007 | Fox |
| 2007/0228691 A1 | 10/2007 | Fox |
| 2007/0262555 A1 | 11/2007 | Fox |
| 2007/0296163 A1 | 12/2007 | Fox |
| 2008/0007017 A1 | 1/2008 | Fox |
| 2008/0035439 A1 | 2/2008 | Fox |
| 2008/0053767 A1 | 3/2008 | Fox |
| 2008/0053768 A1 | 3/2008 | Fox |
| 2010/0186836 A1 | 7/2010 | Yoshihiro et al. |
| 2012/0007237 A1 | 1/2012 | Lin et al. |
| 2012/0007327 A1 | 1/2012 | Talavasek |
| 2012/0080279 A1 | 4/2012 | Galasso et al. |
| 2012/0235332 A1 | 9/2012 | Jordan et al. |
| 2013/0319805 A1 | 12/2013 | Becker et al. |
| 2017/0343074 A1 | 11/2017 | Becker |

* cited by examiner

METHOD AND APPARATUS FOR AN ADJUSTABLE DAMPER

CROSS-REFERENCE TO RELATED APPLICATIONS

This application is a continuation and claims priority to and the benefit of co-pending U.S. patent application Ser. No. 16/259,734 filed on Jan. 28, 2019, entitled "METHOD AND APPARATUS FOR AN ADJUSTABLE DAMPER" by William M. Becker, and assigned to the assignee of the present application; U.S. patent application Ser. No. 16/259,734 is herein incorporated by reference in its entirety.

The U.S. patent application Ser. No. 16/259,734 is a continuation and claims priority to and the benefit of U.S. patent application Ser. No. 15/679,471 filed on Aug. 17, 2017, now U.S. Issued U.S. Pat. No. 10,228,039, entitled "METHOD AND APPARATUS FOR AN ADJUSTABLE DAMPER" by William M. Becker, and assigned to the assignee of the present application; U.S. patent application Ser. No. 15/679,471 is herein incorporated by reference in its entirety.

The U.S. patent application Ser. No. 15/679,471 is a continuation and claims priority to and the benefit of U.S. patent application Ser. No. 14/822,859 filed on Aug. 10, 2015, now U.S. Issue Pat. No. 9,739,331, entitled "METHOD AND APPARATUS FOR AN ADJUSTABLE DAMPER" by William M. Becker, and assigned to the assignee of the present application; U.S. patent application Ser. No. 14/822,859 is herein incorporated by reference in its entirety.

The U.S. patent application Ser. No. 14/822,859 is a continuation and claims priority to and the benefit of U.S. patent application Ser. No. 13/890,753 filed on May 9, 2013, now U.S. Issue Pat. No. 9,103,400, entitled "METHOD AND APPARATUS FOR AN ADJUSTABLE DAMPER" by William M. Becker, and assigned to the assignee of the present application; U.S. patent application Ser. No. 13/890,753 is herein incorporated by reference in its entirety.

The U.S. patent application Ser. No. 13/890,753 claims the benefit of and claims priority of U.S. provisional patent application Ser. No. 61/644,859, filed on May 9, 2012, entitled "METHODS AND APPARATUS FOR PRESSURE EQUALIZATION" by William M. Becker, assigned to the assignee of the present application, and is hereby incorporated by reference in its entirety herein.

BACKGROUND

Field of the Invention

Embodiments of the invention generally relate to methods and apparatuses for use in suspension components. Particular embodiments of the invention relate to method and apparatus useful for equalizing ambient pressure within vehicle suspension.

Description of the Related Art

Vehicle suspension systems typically include a spring component or components and a dampening component or components. Typically, mechanical springs, like helical springs are used with some type of viscous fluid-based dampening mechanism and the two are mounted functionally in parallel. In some instances, a spring may comprise pressurized gas and features of the damper or spring are user-adjustable, such as by adjusting the air pressure in a gas spring. A damper may be constructed by placing a damping piston in a fluid-filled cylinder (e.g., liquid such as oil). As the damping piston is moved in the cylinder, fluid is compressed and passes from one side of the piston to the other side. Often, the piston includes vents there-through which may be covered by shim stacks to provide for different operational characteristics in compression or extension.

Ambient air pressure at the time of building a suspension fork is sealed inside the fork legs. When the fork is assembled at low elevation and then taken to ride at high elevations, the air pressure sealed in the lower leg, because of the decreased high elevation exterior air pressure and corresponding differential pressure, adds pressure and load to the seal, which ultimately creates significantly higher axial friction in the telescoping suspension fork.

As the foregoing illustrates, what is needed in the art are improved techniques for lowering equalizing ambient pressure within a vehicle suspension.

The drawings referred to in this description should be understood as not being drawn to scale except if specifically noted.

BRIEF DESCRIPTION

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is applicable to alternative embodiments, modifications and equivalents, which may be included within the spirit and scope of the invention as defined by the appended claims.

Figure 1:
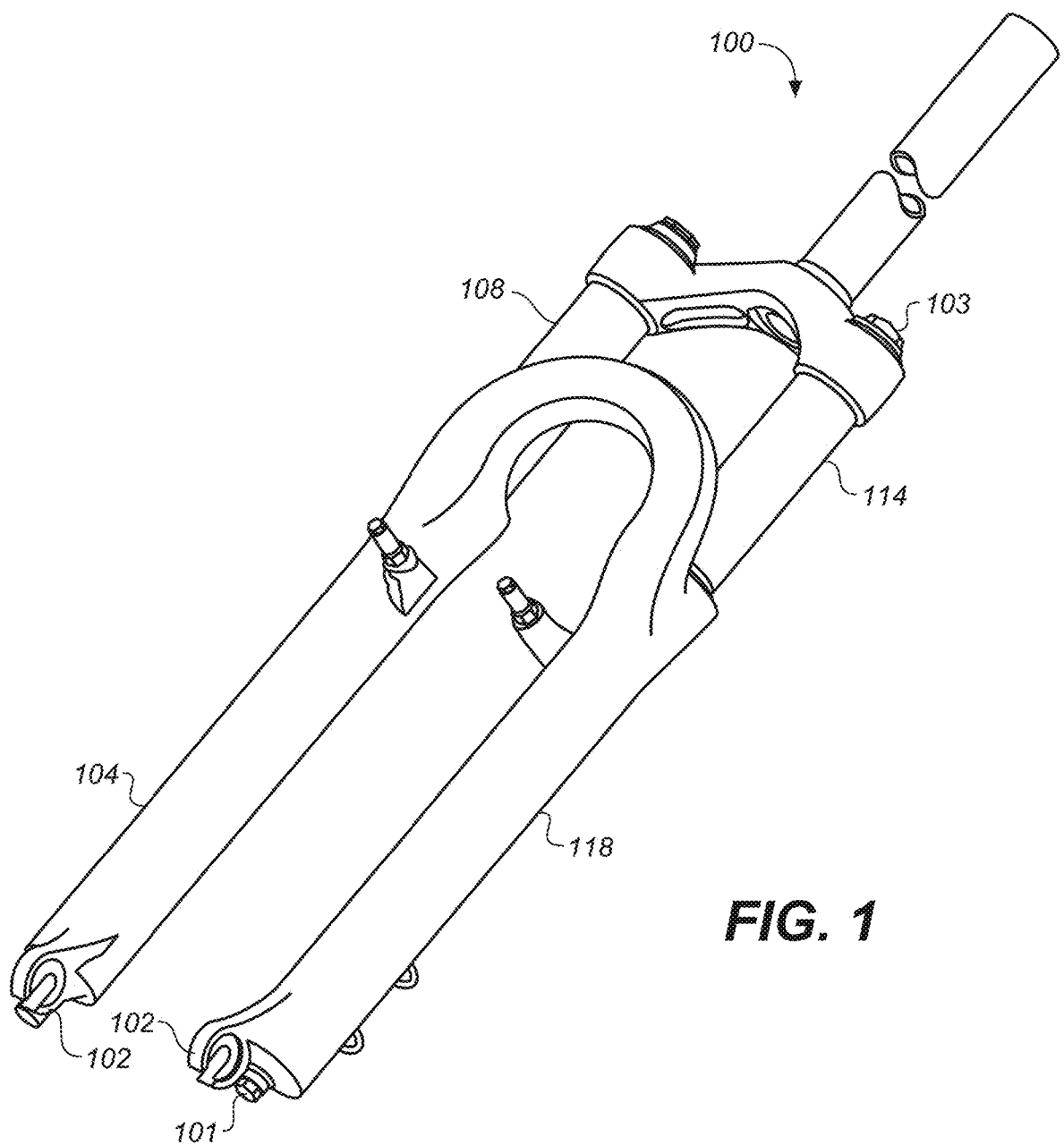
FIG. 1 depicts a front bicycle fork, in accordance with an embodiment.

One embodiment hereof comprises a shock absorber for a vehicle. In one embodiment, the vehicle is a bicycle. The shock absorber, for example, a front fork 100 as shown in FIG. 1, is advantageous because it includes a damper 118/114 (lower fork tube and upper fork tube, respectively, of the damper leg) having a manually adjustable damping resistance. In one embodiment, the manually adjustable damping function allows a user to adjust a "platform" threshold which must be exceeded before the shock absorber can experience significant compression travel. It allows the user to establish a level, in one embodiment, for compression damping whereby such damping is increased or decreased selectively.

U.S. Pat. No. 6,135,434, which patent is herein incorporated by reference in its entirety, shows certain variations of positive and negative spring mechanisms. Another selectively variable damping mechanism is shown in U.S. Pat. No. 6,360,857, which patent is herein incorporated by reference in its entirety. Optionally, any of the foregoing mechanisms may be integrated, or used in combination, with any other features disclosed herein.

U.S. Pat. Nos. 6,415,895, 6,296,092, 6,978,872 and 7,308,976, each of which patents is herein incorporated by reference in its entirety, show certain variations of position sensitive damping mechanisms. Another position sensitive damping mechanism is shown in U.S. Pat. No. 7,374,028, which patent is herein incorporated by reference in its entirety. Another position sensitive damping mechanism is shown in U.S. Pat. No. 5,190,126, which patent is herein incorporated by reference in its entirety. Optionally, any of the foregoing mechanisms may be integrated, or used in combination, with any other features disclosed herein.

U.S. Pat. Nos. 6,581,948, 7,273,137, 7,261,194, 7,128,192, and 6,604,751, each of which patents is herein incorporated by reference in its entirety, show certain variations of inertia valve mechanisms for controlling aspects of compression damping. Additionally, U.S. Published patent Application Nos. 2008/0053768 A1, 2008/0053767 A1, 2008/0035439 A1, 2008/0007017 A1, 2007/0296163 A1, 2007/0262555 A1, 2007/0228691 A1, 2007/0228690 A1, 2007/0227845 A1, 2007/0227844 A1, 2007/0158927 A1, 2007/0119670 A1, 2007/0068751 A1, 2007/0012531 A1, 2006/0065496 A1, each of which patent applications is herein incorporated by reference in its entirety, show certain variations of inertia valve mechanisms for controlling aspects of compression damping. Optionally, any of the foregoing inertia valve mechanisms or other features may be integrated, or used in combination, with any other features disclosed herein. A shock absorber or fork may be equipped, for example, with an inertia valve for controlling an aspect of damping and a position sensitive valve for controlling another aspect of damping.

Figure 3:
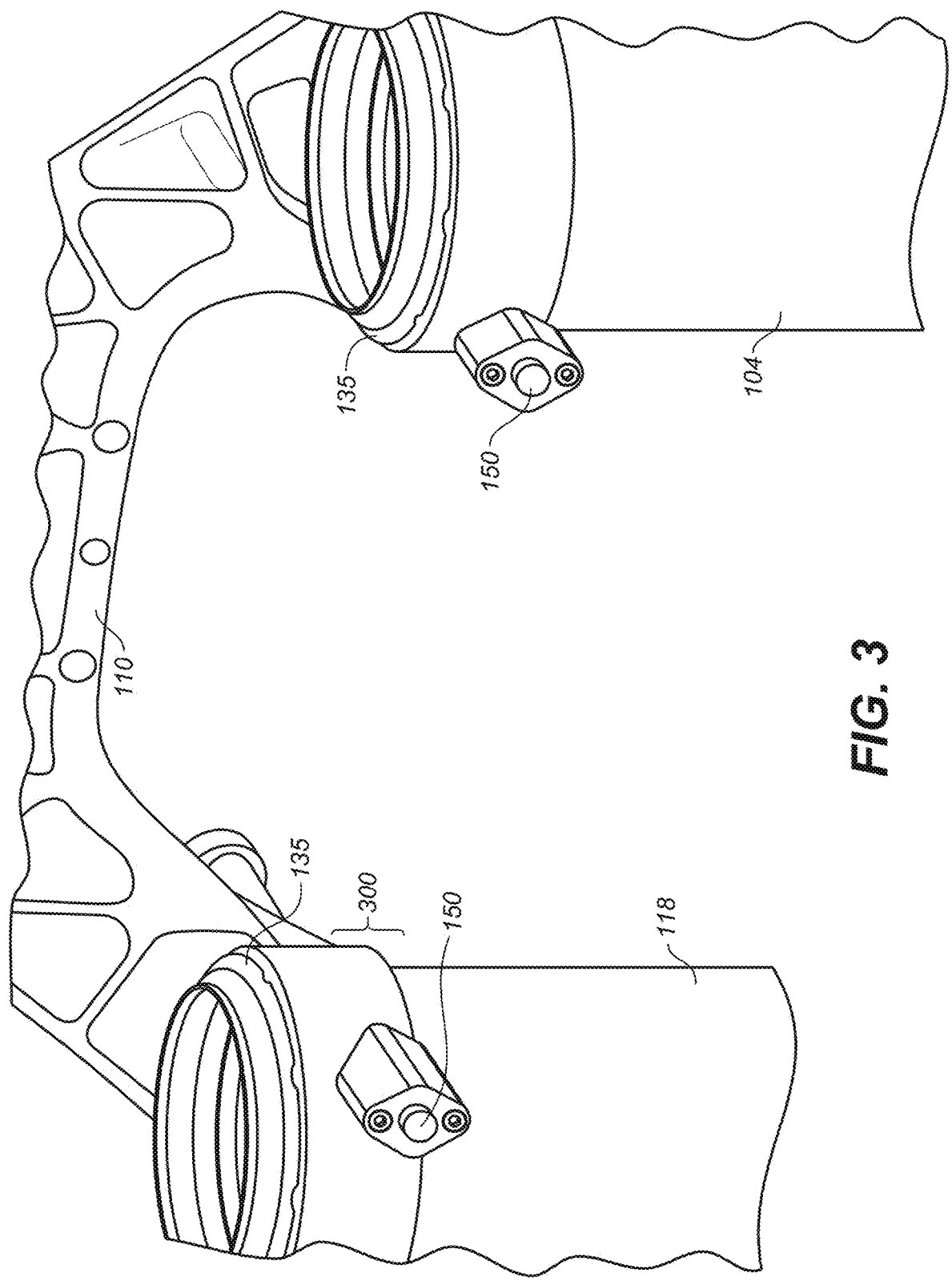
FIG. 3 depicts a perspective view of the air bleed assembly, in accordance with an embodiment.
Figure 4:
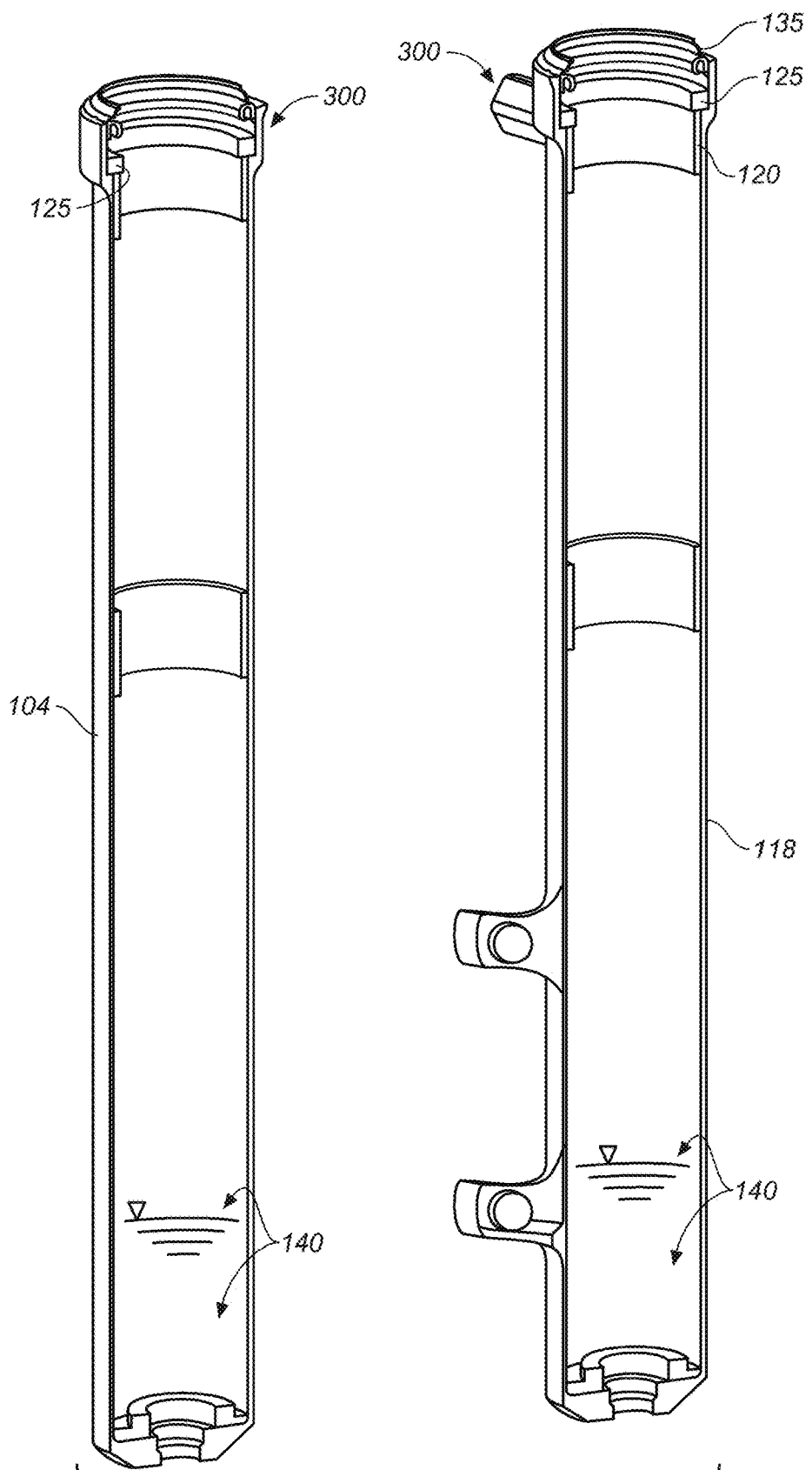
FIG. 4 depicts a positioning of the air bleed assembly relative to the oil bath lubrication in the lower leg/shock tube, in accordance with an embodiment.

FIG. 1, FIG. 3, and FIG. 4, show suspension fork legs, either or both of which would, in one embodiment, comprise portions of a bicycle fork (or motorcycle fork). During operation, the damper leg of the fork is subject to compression and rebound loads. The compression is induced by disparities in the terrain being traversed by a vehicle equipped with the fork. The rebound is induced by a spring (e.g. gas spring, mechanical spring, coil—not shown but for example in leg 104/108), preferably located in another leg of the fork, which stores energy during compression of the fork and then releases that energy when the disparity is passed. The energy is released in urging the suspension unit to elongate axially following the axial compression during which the energy is stored. The top cap 103 and its connected parts move with the upper fork tube 114 and 108 during compression and rebound and the lower nut assembly 101 and its connected parts move with the lower fork tube 104 or 118.

Movement of the upper fork tube (e.g., 114) relative to the lower fork tube (e.g., 118) causes a piston assembly to move axially within the damper body. During a compression stroke, the piston assembly moves downward in the damper body and thereby reduces the volume of the compression chamber. As fluid is displaced from the compression chamber, some of it flows through passages and deflects a one way shim valve to enter the rebound chamber. Some of the displaced fluid flows through an orifice into a reservoir. The resistance to movement of fluid from the compression chamber, through passages (and shim valve on piston) and the orifice provide compression damping for the suspension unit in which the damper cartridge is included.

Ambient air pressure at the time of building a suspension fork is "sealed" inside the upper leg/lower leg assembly (e.g., upper fork tube 114 telescopically positioned within lower fork tube 118). In one embodiment, it is preferred that the air pressure within the assembly at static (unloaded) extension be substantially equal to ambient exterior air pressure so that there is no net differential pressure acting across the lower leg seal 135 (see FIG. 3). Suspension forks are often ridden at many different elevations, however, and the ambient air pressure reduces (decreases) as a function of increasing elevation (and increases at lower elevations).

Air pressure above sea level can be calculated as:

$$P=1091325(1-2.2577 \cdot 10^{-5}h)^{5.25588}$$

Where p=pressure absolute and h=altitude above sea level.

The typical ambient air pressure at 8,000 ft. elevation is 3.80 psi lower than the trapped air pressure inside the fork. The typical ambient air pressure at 10,000 ft. elevation is 4.60 psi lower than the trapped air pressure inside the fork. (http://www.enqineerinqtoolbox.com/air-altitude-pressure-d 462.html.)

When a fork is assembled at low elevation and then taken to ride at high elevations, the "sealed lower leg air pressure", because of the now decreased high elevation exterior air pressure and corresponding differential pressure, adds pressure and load to the lower oil control lip of the seal which creates significantly higher axial friction in a telescoping suspension fork.

The presently disclosed system allows a rider to push a button and let the pressure in the lower leg equalize to ambient pressure at high elevation and therefore restore a lower-friction fork. Generally, it is important to seal a fork to prevent the lower leg oil bath lubrication from leaking out of the fork. In one embodiment, the air bleed assembly 300 (of FIG. 4) is located right below the lower leg seal 135 so that when excessive air pressure in the fork is relieved at high elevation, the oil bath 140 typically leveled in the lower leg (typically 20-50 cc) does not spray/leak out. In other words, a substantial portion (most of the oil bath 140), if not all, of the oil bath 140 remains within the lower leg (and does not spray/leak out of the lower leg) when the air bleed assembly 300 is opened to release excessive air pressure from the fork.

FIG. 3 shows the air bleed assembly 300 including button 150 positioned on a die-cast feature of the lower leg. Pressing the button 150 equalizes the air pressure in the fork/shock assembly with the local ambient air pressure.

Figure 2:
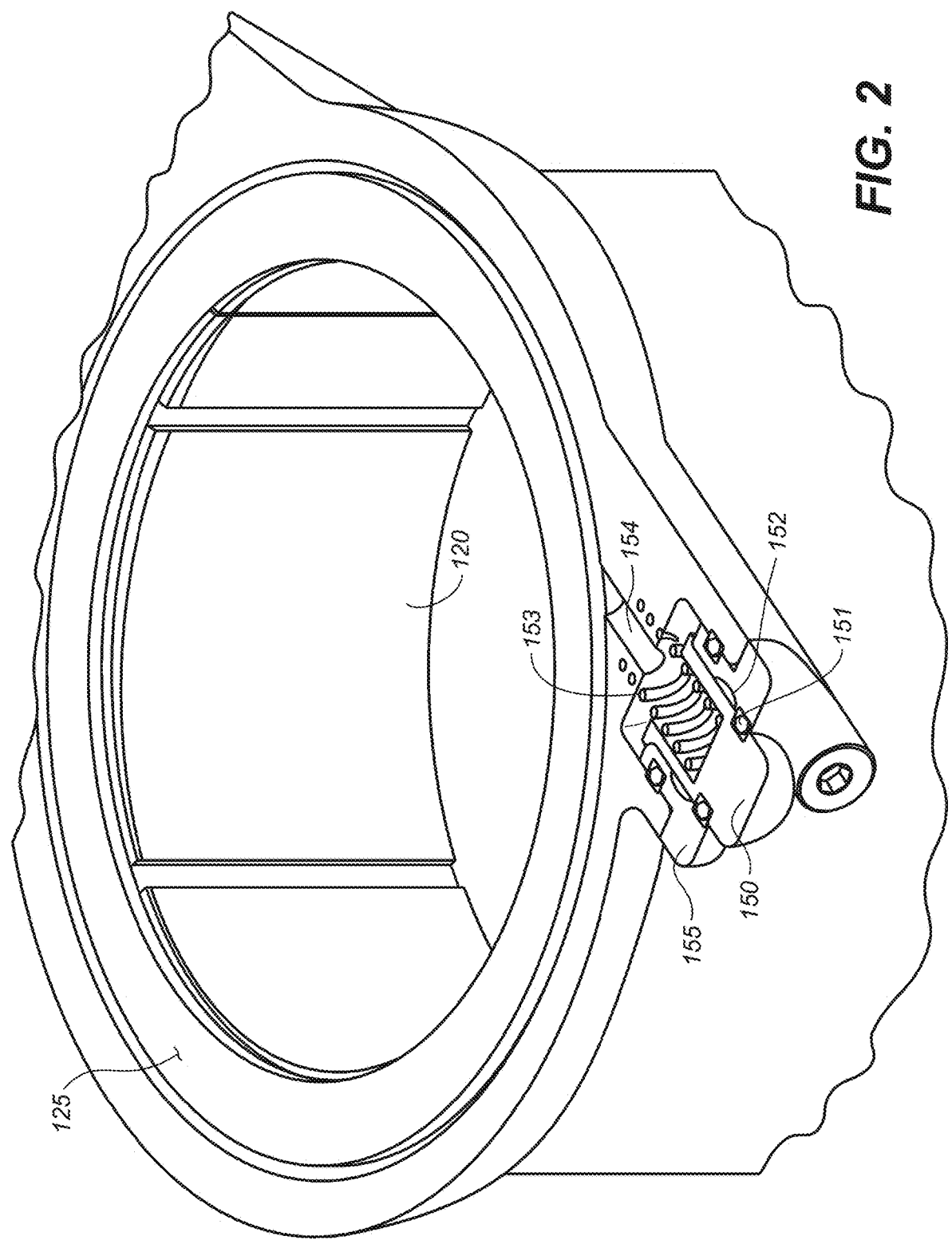
FIG. 2 depicts a cross-sectional view of the air bleed assembly and the vent hole between the seal and the upper busing, in accordance with an embodiment.

FIG. 2 shows a cross-section of the air bleed assembly 300 and the vent hole 154 between the seal (not shown) and the upper bushing 120 (or behind foam ring 125). When the button 150 is pressed, the sealing o-ring 151 moves into the diametrical recess 152 and thereby becomes unsealed, letting the air pressure by-pass into or out of the fork leg via vent hole 154 to equalize the pressure in the fork leg with an exterior pressure. When the button 150 is released, a spring 153, which biases the button/valve 150 toward a closed position, urges the o-ring 151 into a sealing engagement with a seal bore 155.

FIG. 4 shows positioning of the air bleed assembly 300 relative to the "oil bath" lubrication in the lower leg/shock tube.

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the claims that follow.

What is claimed is:

1. An air bleed assembly comprising:
a lower fork, said lower fork configured to have a first end coupled to a vehicle wheel, and a second end configured to be telescopically engaged with a first end of an upper fork;
a fluid passage disposed between an interior of said lower fork and an exterior of said lower fork;
a manually operable valve located in said lower fork and coupled to said fluid passage, said manually operable valve disposed in said lower fork proximate a lower fork seal, said lower fork seal configured to provide a seal at a location where said lower fork telescopically engages with said upper fork, said manually operable valve having a first position substantially closing said fluid passage and a second position allowing a fluid to flow between said interior and said exterior, wherein said fluid comprises a gas, and wherein said fluid passage and said manually operable valve are located at a distance from an oil bath lubrication within said lower fork, such that when said manually operable valve is in said second position, most of said oil bath lubrication remains within said lower fork and such that when trapped air pressure inside said lower fork, that is higher than a local ambient air pressure outside of said suspension fork, is relieved, most of said oil bath lubrication that is within said lower fork remains within said lower fork; and
a valve activator coupled with said manually operable valve, said valve activator comprising:
an activation position placing said manually operable valve into said first position;
a deactivation position placing said manually operable valve into said second position, and whereupon when in said activation position, the trapped air pressure in said lower fork is equalized with the local ambient air pressure; and
a button to select said activation position and said deactivation position.

* * * * *